2,924,594

POLYMERIZATION OF ETHYLENE USING AS CATALYST THE PRODUCT FORMED BY MIXING A BIS(CYCLOPENTADIENYL) VANADIUM SALT WITH AN ALKYL METALLIC COMPOUND

David S. Breslow, Wilmington, Del., assignor to Hercules Powder Company, Wilmington, Del., a corporation of Delaware No Drawing. Application August 23, 1956
Serial No. 605,704

9 Claims. (Cl. 260—94.9)

This invention relates to an improved process for polymerizing ethylene whereby it is possible to carry out the polymerization at amospheric or at only slightly elevated pressures and at relatively low temperatures and obtain a polyethylene having very desirable and unusual properties, and to the catalyst used for the polymerization.

In Belgian Patents No. 533,362, 534,792 and 534,888 of K. Ziegler et al., there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table, or manganese, in combination with an organometallic compound of an alkali metal, alkaline earth metal, zinc, earth metal (especially aluminum), or rare earth metal. The process is usually carried out by mixing the two catalyst components in a hydrocarbon diluent and then passing the ethylene into the catalyst mixture at atmospheric or slightly elevated pressure and at room temperature or moderately elevated temperatures.

Now, in accordance with this invention, it has been found that an entirely different type of vanadium compound, namely, a bis(cyclopentadienyl)vanadium salt such as bis(cyclopentadienyl)vanadium dichloride, may be used to produce a catalyst which gives excellent results in the polymerization of ethylene. These bis(cyclopentadieny)vanadium salts are true organometallic compounds having a carbon to metal bond and it was most surprising to find that they could be used in combination with a metal alkyl compound of a metal of group I–A, II–A or III–A of the periodic table to produce a new catalyst for the polymerization of ethylene. As will be apparent from the following discussion, the use of a bis(cyclopentadienyl)vanadium salt in combination with a metal alkyl compound, and particularly in combination with an alkyl-aluminum compound, is an effective catalyst for the polymerization of ethylene to yield a high molecular weight polymer.

The polymerization of ethylene in accordance with this invention is carried out by mixing the bis(cyclopentadienyl)vanadium salt with one of the metal alkyl reducing compounds, usually in an inert organic diluent, and contacting ethylene with the reaction mixture. Any bis(cyclopentadienyl)vanadium salt may be used as the vanadium component of the catalyst mixture. Thus, the anion may be that of an inorganic acid, an organic acid, an alkoxide group, etc. Exemplary of such anions are sulfate, fluoride, chloride, bromide, iodide, nitrate, phosphate, acetate, propionate, methoxide, ethoxide, butoxide, isobutoxide, etc. Of particular value are the bis(cyclopentadienyl)vanadium halides. The cyclopentadienyl moiety may be an alkyl-substituted cyclopentadienyl radical containing from 1 to 2 alkyl substituents. The alkyl groups may be alike or different and preferably will be alkyl groups containing from 1 to 8 carbon atoms. Thus, the cyclopentadienyl moiety of such bis(cyclopentadienyl)vanadium salts may be an alkyl-substituted cyclopentadienyl radical such as methylcyclopentadienyl, dimethylcyclopentadienyl, ethylcyclopentadienyl, propylcyclopentadienyl, methylethylcyclopentadienyl, etc. These compounds are readily prepared by reacting a vanadium compound of the desired anion with cyclopentadienylsodium or alkyl derivatives thereof.

The metal alkyl reducing compound that is reacted with the vanadium compound may be any alkyl compound of a metal of groups I–A, II–A or III–A of the periodic table, i.e., any alkali metal, alkaline earth metal or aluminum. Exemplary of these metal alkyl compounds are the alkali metal alkyls such as n-butyllithium, n-amylsodium, etc., alkaline earth metal alkyls such as dimethylmagnesium, diethylmagnesium, butylmagnesium chloride, butylmagnesium bromide, and aluminum alkyls such as triethylaluminum, tripropylaluminum, triisobutylaluminum, trioctylaluminum, dimethylaluminum chloride, diethylaluminum chloride, diisobutylaluminum hydride, etc.

The reaction between the vanadium compound and the metal alkyl compound is readily carried out by mixing the two compounds in any inert diluent, as for example, aliphatic hydrocarbons such as hexane, heptane, isooctane, etc., cycloaliphatic hydrocarbons such as cyclohexane, or aromatic hydrocarbons such as benzene, toluene, xylene, etc., halogenated aromatic hydrocarbons such as chlorobenzenes, chloronaphthalenes, etc., or any mixtures of such inert diluents. In carrying out the reaction between the two compounds, any concentration of the two reagents may be used that is convenient and the reaction may be carried out at any temperature, the latter generally being determined by the solvent being used, the activity of the reducing agent, etc. Usually the reaction is conveniently carried out at room temperature or at slightly elevated temperatures, but a temperature of from about −50° C. to about 150° C. could be used. The molar ratio of the metal alkyl compound to the vanadium compound may be varied over a wide range and will depend largely upon the metal alkyl compound used. In general, the molar ratio of the metal alkyl compound to the vanadium compound will be from about 0.1:1 to 100:1, and more usually will be from about 1:1 to 10:1. The catalyst so obtained may be used immediately or it may be conveniently stored and used as desired. An alternate method of carrying out the reaction between the vanadium compound and the metal alkyl reducing compound for the polymerization process is to add the olefin to a solution or mixture of the bis(cyclopentadienyl)vanadium compound and then add the metal alkyl reducing compound as needed for the polymerization.

The polymerization process may be carried out in a wide variety of ways, as for example, either as a batch or continuous operation. As already pointed out, the catalyst combinaiton may be performed or it may be formed in situ, the latter being especially adapted for this polymerization process. In some instances it is desirable to prepare the preformed catalyst as described above and then use it in connection with an additional organometallic reducing compound. The latter may be the same organometallic reducing compound as used in preparing the preformed catalyst or it may be a different one. By proper selection of metal alkyl used with the bis(cyclopentadienyl)vanadium compound and of the diluent for the polymerization, it is possible to vary the molecular weight of the polymer produced, etc.

Another variation that is frequently desirable, depending upon the type of polymer desired, is to add a viscosity reducing agent to the polymerization, as for example, hydrogen, whereby it is possible to produce lower molecular weight polymers than would otherwise normally be obtained. Obviously, many other variations in the process may be made.

The selection of the temperature and pressure used for the polymerization process will depend upon many factors such as the degree of polymerization desired, etc. In general, the polymerization will be carried out at room temperature or slightly above, but any temperature within the range of from about −50° C. to about 150° C. and preferably from about −10° C. to about 100° C. may be used. In the same way, while atmospheric pressure or a pressure of only a few pounds may be used, the polymerization may be carried out over a wide range of pressures as, for example, from a partial vacuum to about 1000 lb. and preferably from about atmospheric to about 500 lb. pressure. Higher pressures may, of course, be used, but generally do not appreciably alter the course of the polymerization.

The following examples will illustrate the process of polymerizing ethylene in accordance with this invention and some of the many variations that can be made in this process. The molecular weight of the polymers produced in these examples is shown by the reduced specific viscosity (RSV) given for each. By the term "reduced specific viscosity" is meant the $\eta sp/C$ determined on an 0.1% solution of the polymer in decalin, containing 0.1 g. of the polymer per 100 ml. of solution, at 135° C. All parts and percentages are by weight unless otherwise indicated.

PREPARATION OF BIS(CYCLOPENTADIENYL)-VANADIUM DICHLORIDE

Cyclopentadienylsodium was prepared by adding 15 parts of cyclopentadiene dropwise to 6.1 parts of a sodium dispersion (45% in toluene) in 225 parts of tetrahydrofuran under a stream of nitrogen. The reaction was exothermic and cooling was necessary to keep the temperature at about 25° C. The cyclopentadienylsodium solution was then added slowly to a solution of 10 parts of vanadium tetrachloride (as a 0.9 molar solution in heptane) in 225 parts of tetrahydrofuran. The addition was carried out under nitrogen and with the temperature held at about 25° C. The mixture was agitated for 2 hours and a small amount of anhydrous hydrogen chloride was added. The solvent was removed and the residue was extracted with chloroform saturated with hydrogen chloride. The chloroform extract was cooled to about −70° C. whereupon green crystals separated. These were separated by filtration and recrystallized from chloroform. A carbon, hydrogen and chlorine analysis was in agreement with the theoretical amounts for bis(cyclopentadienyl)-vanadium dichloride.

Examples 1–6

A series of polymerization vessels in which the air had been displaced with nitrogen was charged with 40 parts of toluene and after evacuating, 2 parts of ethylene was added. In Example 1 the catalyst was formed in situ by adding a solution of the alkyl aluminum compound in heptane followed by addition of 0.063 part of bis(cyclopentadienyl)vanadium dichloride in n-heptane. In Examples 2–6 a preformed catalyst was used which had been prepared by mixing 0.063 part of bis(cyclopentadienyl)-vanadium dichloride in n-heptane with a solution of alkyl aluminum compound in n-heptane and allowing the mixture to age at room temperature for 2 hours before use. This preformed catalyst mixture was then added to each of the polymerization vessels followed by addition of a small amount of oxygen. An additional amount of alkyl-aluminum was added in Examples 2 and 4–6 after 0.5 hr. and/or 19 hrs. and in Examples 4–6 additional oxygen was added after 19 hrs. In Examples 4b, 5b and 6b, hydrogen was also added at the beginning of the polymerization. The alkyl aluminum compound used in each of these examples and the amount thereof and the amount of oxygen and hydrogen added and the reaction times are set forth in the following table. At the end of the polymerization 4 parts of ethanol was added to stop the polymerization. The polymer was then separated by filtration and refluxed for 15 minutes with a 10% solution of hydrogen chloride in methanol. It was separated and washed with methanol and dried in a vacuum oven at 80° C. for 4 hours. The RSV of the polymer obtained in each case along with the melting points determined on some are set forth in the table.

TABLE

| Example | Alkylaluminum | | Mole Percent $O_2$ [1] | Mole Percent $H_2$ [2] | Reaction Time, Hrs. at 30° C. | Polymer Isolated | |
|---|---|---|---|---|---|---|---|
| | Added | Parts | | | | RSV | Melting Point, °C. |
| 1a | Al(C$_2$H$_5$)$_2$Cl | 0.12 | | | 19 | 30 | |
| 1b | Al(C$_2$H$_5$)$_3$ | 0.11 | | | 19 | >60 | |
| 2a | Al(C$_2$H$_5$)$_2$Cl | 0.06<br>0.06 | 0.3 | | 0<br>19<br>21 | 34 | 134 |
| 2b | Al(C$_2$H$_5$)$_3$ | 0.05<br>0.05 | 0.3 | | 0<br>19<br>22.5 | >60 | |
| 3 | Al(C$_2$H$_5$)$_2$Cl | 0.06 | 0.1 | | 21 | 54.5 | 135 |
| 4a | Al(C$_2$H$_5$)$_2$Cl | 0.06<br>0.04<br>0.04 | 0.1<br>0.1 | | 0<br>0.5<br>19<br>42 | 33 | 131 |
| 4b | Al(C$_2$H$_5$)$_2$Cl | 0.06<br>0.04<br>0.04 | 0.1 | 11.2 | 0<br>0.5<br>19<br>42 | 15.6 | 129 |
| 5a | Al(i-C$_4$H$_9$)$_3$ | 0.1<br>0.07<br>0.07 | 0.1<br>0.1 | 11.2 | 0<br>0.5<br>19<br>42 | 10.3 | |
| 5b | Al(i-C$_4$H$_9$)$_3$ | 0.1<br>0.07<br>0.07 | 0.1<br>0.1 | 11.2 | 0<br>0.5<br>19<br>42 | 2.7 | |
| 6a | Al(i-C$_4$H$_9$)$_2$Cl | 0.09<br>0.06<br>0.06 | 0.1<br>0.1 | | 0<br>0.5<br>19<br>42 | 35 | 136 |
| 6b | Al(i-C$_4$H$_9$)$_2$Cl | 0.09<br>0.06<br>0.06 | 0.1<br>0.1 | 11.2 | 0<br>0.5<br>19<br>42 | 9.8 | 133 |

[1] Mole percent $O_2$ based on ethylene.
[2] Mole Percent $H_2$ based on ethylene+hydrogen.

Examples 7 and 8

Each of two polymerization vessels, free of air, was charged with 40 parts of toluene and after evacuating, 1.9 parts of ethylene was added. The catalyst was formed in situ by adding in Example 7, 0.06 part of diethylmagnesium ballmilled in 0.9 part of n-heptane and in Example 8, 0.05 part of n-amylsodium in 0.7 part of n-heptane and then adding to each 0.063 part of bis-(cyclopentadienyl)vanadium dichloride. The polymerization in each case was carried out at 30° C. and was stopped in Example 7 after 18 hrs. At this time, 0.3 mole percent of oxygen based on the ethylene was injected into the polymerization reaction of Example 8 followed by an addition of 0.05 part of n-amylsodium in 1 hour and a second addition of the same amount of n-amylsodium in another hour. The polymerization reactions were stopped by adding 4 parts of ethanol. The total reaction mixture in each case was washed with a 10% methanolic solution of hydrogen chloride and then with water until neutral, after which the polymer was collected and dried in vacuum for four hours at 80° C.

What I claim and desire to protect by Letters Patent is:

1. The process of polymerizing ethylene which comprises contacting ethylene with a catalyst formed by mixing a bis(cyclopentadienyl) vanadium salt, wherein the cyclopentadienyl moiety is selected from the group consisting of cyclopentadienyl and alkylcyclopentadienyl radicals, with an alkyl metallic compound of a metal selected from the group consisting of the metals of groups I-A, II-A and III-A of the periodic table.

2. The process of claim 1 wherein the cyclopentadienyl moiety is the cyclopentadienyl radical.

3. The process of claim 2 wherein the bis(cyclopentadienyl) vanadium salt is a halide.

4. The process of polymerizing ethylene which comprises contacting ethylene with a catalyst formed by mixing bis(cyclopentadienyl)vanadium dichloride with a trialkylaluminum.

5. The process of polymerizing ethylene which comprises contacting ethylene with a catalyst formed by mixing bis(cyclopentadienyl)vanadium dichloride with a dialkylaluminum chloride.

6. A polymerization catalyst comprising the product formed by reacting a bis(cyclopentadienyl)vanadium salt, wherein the cyclopentadienyl moiety is selected from the group consisting of cyclopentadienyl and alkylcyclopentadienyl radicals, with an alkyl metallic compound of a metal selected from the group consisting of the metals of groups I-A, II-A and III-A of the periodic table.

7. A polymerization catalyst comprising the product formed by reacting a bis(cyclopentadienyl)vanadium salt with a trialkylaluminum.

8. A polymerization catalyst comprising the product formed by reacting a bis(cyclopentadienyl)vanadium salt with a dialkylaluminum chloride.

9. The process of claim 1 where ethylene is contacted with the catalyst in the presence of from 0.1 to 0.3 mole percent oxygen based on the amount of ethylene.

References Cited in the file of this patent

UNITED STATES PATENTS

| | | |
|---|---|---|
| 2,827,446 | Breslow | May 18, 1958 |

FOREIGN PATENTS

| | | |
|---|---|---|
| 533,362 | Belgium | May 16, 1955 |

OTHER REFERENCES

Wilkinson et al.: Jour. of Amer. Chem. Soc., vol. 76 (1954), pages 4281–4.